H. SMITH AND L. LE R. CARPENTER.
SHOCK ABSORBER.
APPLICATION FILED DEC. 11, 1919.
1,354,465.
Patented Oct. 5, 1920.
2 SHEETS—SHEET 1.
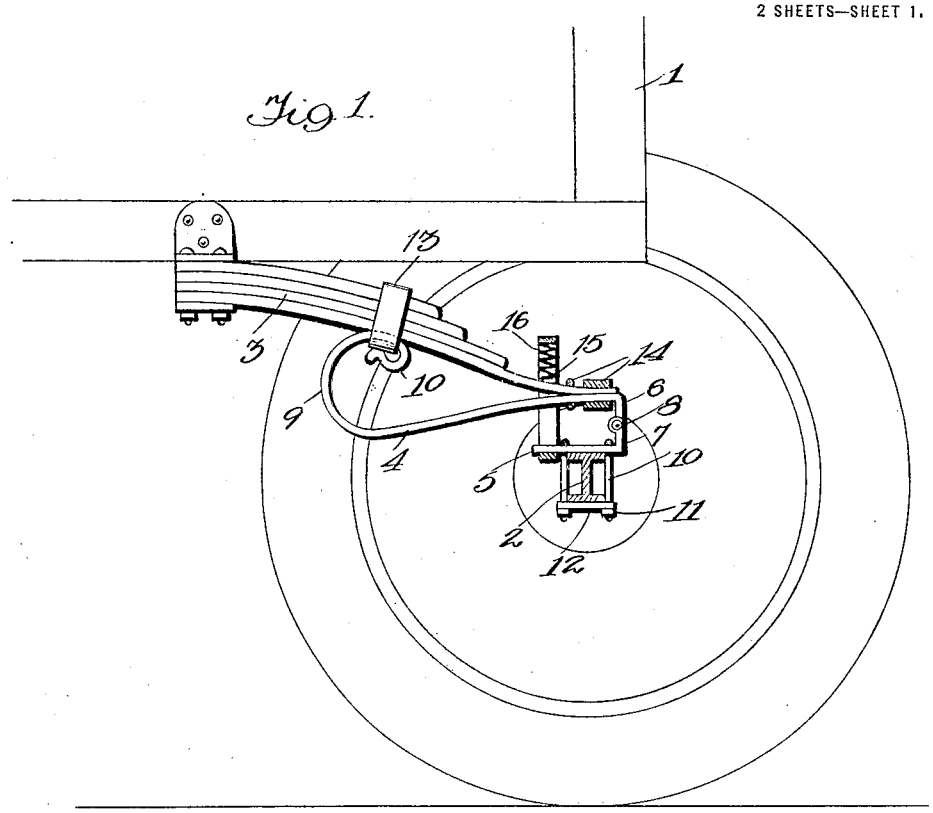
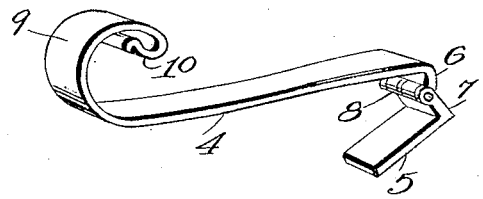
WITNESSES
INVENTOR
H. SMITH,
L. L. CARPENTER,
BY
ATTORNEYS H. SMITH AND L. LE R. CARPENTER.
SHOCK ABSORBER.
APPLICATION FILED DEC. 11, 1919.

1,354,465.

Patented Oct. 5, 1920.
2 SHEETS—SHEET 2.

WITNESSES
George C. Myers
E. L. Wacker

INVENTOR
H. SMITH,
L. L. CARPENTER.
BY
ATTORNEYS

UNITED STATES PATENT OFFICE.

HERBERT SMITH AND LAWRENCE LE ROY CARPENTER, OF AMORET, MISSOURI.

SHOCK-ABSORBER.

1,354,465.    Specification of Letters Patent.    Patented Oct. 5, 1920.

Application filed December 11, 1919. Serial No. 344,189.

*To all whom it may concern:*

Be it known that we, HERBERT SMITH and LAWRENCE L. CARPENTER, both citizens of the United States, and residents of Amoret, in the county of Bates and State of Missouri, have invented certain new and useful Improvements in Shock-Absorbers, of which the following is a specification.

Our invention is an improvement in shock absorbers, and has for its object to provide mechanism of the character specified, adapted to be arranged between the springs of a vehicle and the axle for cushioning and supplementing the action of the spring, and especially designed for cushioning the upward movement of the body with respect to the axle.

In the drawings:

Figure 1 is a sectional view of the front axle of the vehicle showing the absorber in place.

Fig. 2 is a perspective view of the absorber detached.

Figure 3:
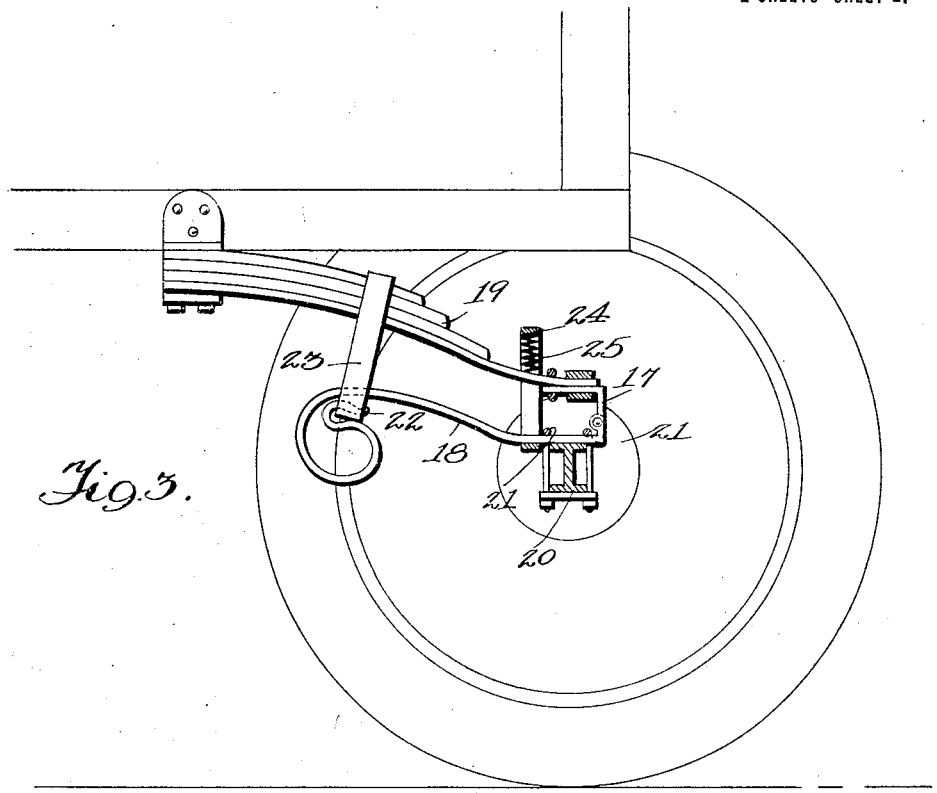
Fig. 3 is a view similar to Fig. 1 showing another arrangement.

In the present embodiment of the invention the shock absorber is shown in connection with a motor vehicle having the usual frame or body 1 and axles 2, the front axle only being shown, and the shock absorber is arranged between the spring 3 and the axle. The shock absorber comprises an arm 4 and an arm 5, the arm 4 being relatively long, while the arm 5 is relatively short.

Each of these arms is provided at one end with an angular portion 6 and 7, respectively, and these angular portions are connected by a hinge joint 8. At the opposite end from the hinge, the arm 4 has a curved portion 9 provided at its extremity with a hook 10.

The absorber is connected as shown in Fig. 1, the arm 5 being clipped to the axle, while the arm 4 is clipped to the spring. The arm 5 is connected to the axle by means of the usual U-shaped clips 10, the bodies of the clips embracing the arm, while the arms of the clips pass downwardly alongside the axle and are engaged by nuts 11 below the axle, and below holding plates 12 which connect the said arms below the axle.

The arm 4 is connected to the body of the spring, that is, it is clipped about all of the leaves of the spring by a clip 13, and it is clipped to the extended end of the longest leaf by clips 14. A clip 15 is arranged about the extended end of the longest leaf of the spring, and about both arms 4 and 5 of the absorber, the said clip being of greater length than the distance between the arm 5 and the extended end of the spring leaf, and a coil spring 16 is arranged between the extended end of the leaf and the upper end of the clip. This permits a limited movement of the spring and of the arm 4 with respect to the arm 5.

In operation, when the body moves downward, the arm 4 swings on the hinge 8, offering no resistance to the downward movement of the body. When, however, the body moves upward on the rebound, such upward movement or rebound will be cushioned by the shock absorber.

Figure 4:
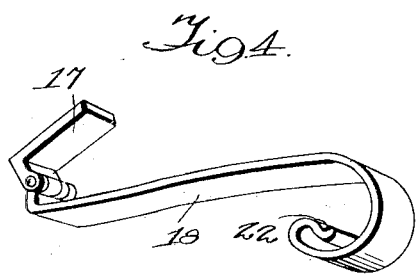
Fig. 4 is a perspective view of the absorber detached.

In the embodiment of the invention shown in Figs. 3 and 4, the absorber consisting of the leaves 17 and 18 is the same as that shown in Fig. 1, but the arrangement is reversed. The leaf 17 is connected with the end of the spring 19, and the leaf 18 rests upon the axle 20 being secured thereto by the clips 21.

The hook 22 which corresponds to the hook 10 of Fig. 1 is engaged by a loop 23, which connects it to the body of the spring 19. A substantially rectangular frame 24 encircles the longest lamina of the spring leaf 18, being of greater length than the distance between the two, and a spring 25 is arranged between the lamina and the top of the frame, serving the same purpose as the spring 16. Thus the absorber may be used either in the position of Fig. 1, or that shown in Fig. 3.

We claim:

1. In a motor vehicle, the combination with the springs and the axles, of shock absorbers arranged between the springs and the axles, each of the said shock absorbers comprising a relatively long arm and a relatively short arm hinged together, each arm having an angular portion at the hinge, so that the body of the arms may extend approximately parallel in spaced relation, the short arm being secured to the axle and the long arm having a curved portion connected with the spring, and a connection between the spring and the long arm adjacent to the angular portion.

2. A shock absorber for motor vehicles, comprising a relatively long and a relatively short arm hinged at one end, said arms having angular portions at the hinge for permitting said arms to lie approximately parallel, and the long arm having its opposite end bent over outwardly upon the body portion in spaced relation, and provided with a hook for the purpose specified.

3. A shock absorber for motor vehicles, comprising a relatively long and a relatively short arm hinged at one end, said arms having angular portions at the hinge for permitting said arms to lie approximately parallel, and the long arm having its opposite end bent over outwardly upon the body portion in spaced relation.

4. A shock absorber for motor vehicles, comprising a relatively long and a relatively short arm hinged at one end, said arms having angular portions at the hinge for permitting said arms to lie approximately parallel, and the long arm having its opposite end bent over outwardly upon the body portion in spaced relation, means for connecting the long arm to the spring of a motor vehicle, and means for connecting the short arm of the axle.

5. A shock absorber for motor vehicles comprising a relatively long and a relatively short arm, a hinge connection between the arms at one end and off-set with respect to the arms to permit said arms to lie approximately parallel, the long arm having the end remote from the hinge bent over and outwardly upon the body portion in spaced relation.

6. A shock absorber for motor vehicles comprising a relatively long and a relatively short arm, a hinge connection between the arms at one end and off-set with respect to the arms to permit said arms to lie approximately parallel, the long arm having the end remote from the hinge offset laterally in the opposite direction from the hinge for the purpose specified.

HERBERT SMITH.
LAWRENCE LE ROY CARPENTER.